UNITED STATES PATENT OFFICE.

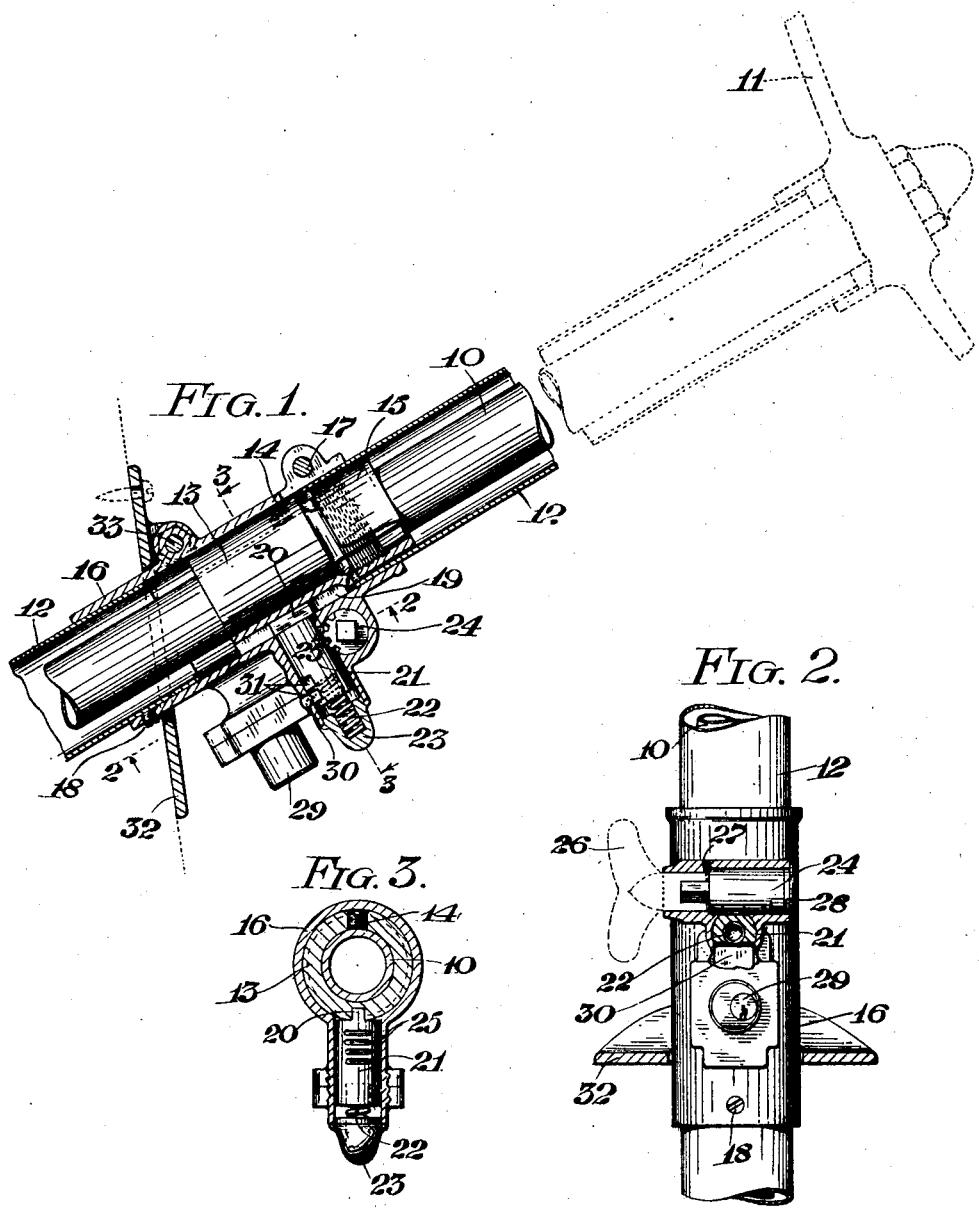

CHARLES R. PIGGINS AND FREDERICK H. PIGGINS, OF RACINE, WISCONSIN.

STEERING-POST LOCK.

1,347,871.   Specification of Letters Patent.   Patented July 27, 1920.

Application filed January 11, 1919. Serial No. 270,703.

*To all whom it may concern:*

Be it known that we, CHARLES R. PIGGINS and FREDERICK H. PIGGINS, citizens of the United States, and residents of Racine, in the county of Racine and State of Wisconsin, have invented new and useful Improvements in Steering-Post Locks, of which the following is a description, reference being had to the accompanying drawings, which are a part of this specification.

This invention has for its object to provide a steering post lock for automobiles which by locking the steering wheel against turning will prevent unauthorized use of the car.

Another object of the invention is to provide a lock of this character adapted for attachment to cars without being built in.

With the above and other objects in view the invention consists in the steering post lock as herein claimed and all equivalents.

Referring to the accompanying drawings, in which like characters of reference indicate the same parts in different views:

Figure 1 is a vertical sectional view of a steering post lock constructed in accordance with this invention;

Fig. 2 is a sectional view on the plane of line 2—2 of Fig. 1; and

Fig. 3 is a sectional view on the plane of line 3—3 of Fig. 1.

In these drawings 10 indicates the usual steering post consisting of a tubular rod or stem connected at its lower end, not shown, with the steering gear and bearing at its upper end the steering wheel 11, while 12 is the usual stationary inclosing tube.

A sleeve 13 is fixed on the steering post 10 in any desirable manner in order to constitute a lock engaging member. As shown the sleeve 13 is provided with a set screw 14 for engaging the steering post 10 as one means for securing it in place thereon, but the main clamping means relied on for locking the two together consists of a nut 15 having a tapering threaded bore screwed onto the tapering threaded reduced end of sleeve 13 which is provided with a number of longitudinally extending slots making it somewhat flexible so that the fingers between the slots may be drawn together to grasp the steering post between them when the nut is tightened.

As there is usually insufficient space between the steering post and the tube 12 to accommodate the sleeve 13, a section of the tube is preferably removed and the remaining portions are connected by a tubular casing 16 having a clamping bolt 17 for drawing its split upper end around one portion of the tube and a set screw 18 at its other end for engaging the other portion of the tube.

The sleeve 13 has a longitudinally extending groove 19 adapted to receive a flange 20 on the end of a longitudinally sliding spring-pressed bolt 21 contained in a bore of the casing 16 at right angles to the axis of the steering post. A coil spring 22 bearing on the end of the bolt 21 and for convenience let into a recess thereof as well as a recess in a plug 23 closing the end of the bore, serves to urge the bolt inwardly to its locking engagement with the sleeve 13.

In another bore of the casing at right angles to the axis of the bolt 21 is rotatably mounted a pinion 24 having a few teeth meshing with rack teeth 25 formed in the sliding bolt 21 and a wrench key 26 fitting on the square end of pinion 24 affords a means by which the pinion may be turned to retract the bolt 21 from its locking engagement with the groove of sleeve 13. The pinion 24 is confined in its bore against longitudinal movement by fitting against a shoulder 27 at one end and against a plug 28 at the other end.

A lock 29, preferably of the pin type, is embodied in the casing 16 and has a movable slide 30 adapted to enter either of a pair of slots 31 in the sliding bolt 21 and thereby lock the bolt in its locking or unlocking position.

A plate 32 having an opening through which the tubular casing 16 loosely passes, is provided with a pivotal connection 33 with said tubular casing whereby the plate may be inclined more or less to fit against the dash or floor board through which the steering post passes.

In operation the sliding bolt 21, which is normally held in its unlocking position by the engagement of the lock slide 30 with the proper slot 31, does not interfere with the turning movement of the steering post. When the barrel of the lock 29 is turned by means of the key, not shown, to withdraw the slide 30, the spring 22 forces the bolt 21 inwardly into engagement with the groove 19 of sleeve 13 and consequently the steering post is locked against movement. The bolt 21 may be locked in this locking position by a turning of the lock barrel to permit the slide 30 to enter the other slot 31. In order to release the steering post lock it is necessary to turn the barrel of the lock 29 to withdraw slide 30 from its engagement with the sliding bolt and then retract the sliding bolt against the action of its spring by turning the pinion 24 by means of the wrench key 26. As the wrench key 26 is removable as well as the lock key it is obvious that unauthorized use of the automobile is effectively prevented by the steering post lock.

In practice the plugs 23 and 28 are soldered in place so as to prevent tampering with the lock.

What we claim as new and desire to secure by Letters Patent is:

1. In a steering post lock, a casing adapted to surround a steering post, a supporting plate having adjusting pivotal connection therewith, a steering post inclosing tube, means on the casing for clamping the steering post inclosing tube, a steering post sleeve within the casing provided with a recess and having a split tapering threaded end, a nut threaded on the end of the sleeve for clamping it to the steering post, a sliding bolt within the casing adapted to engage the recess of the steering post sleeve, means for sliding the bolt, and a lock for locking the bolt.

2. In a steering post lock, the combination, with the steering post, of a sectional post standard, a tubular casing connecting sections of said standard together, a supporting plate pivotally connected to the casing, a member on the steering post having a locking recess therein, and locking means carried by the casing and coöperating with said recess to secure the steering post against rotation.

In testimony whereof, we affix our signatures, in presence of two witnesses.

CHARLES R. PIGGINS.
FREDERICK H. PIGGINS.

Witnesses:
 PETER NELSON,
 HULDA OLSON.